United States Patent [19]

Kutnyak

[11] 4,354,051
[45] Oct. 12, 1982

[54] ELECTRICAL CURRENT-CARRYING FLEXIBLE HOSE AND METHOD OF MAKING SAME

[75] Inventor: Thomas A. Kutnyak, Greenwood, S.C.

[73] Assignee: Automation Industries, Inc., Greenwich, Conn.

[21] Appl. No.: 254,434

[22] Filed: Apr. 15, 1981

[51] Int. Cl.³ .................. A47L 9/24; F16L 11/12; F16L 11/16; B29D 23/12
[52] U.S. Cl. ..................................... 174/47; 138/129; 156/195
[58] Field of Search .................. 174/47; 138/129; 156/143, 195

[56] References Cited

U.S. PATENT DOCUMENTS

| 3,199,541 | 8/1965 | Richitelli | 138/129 |
| 3,679,531 | 7/1972 | Wienand et al. | 174/47 X |
| 4,167,645 | 9/1979 | Carey | 174/47 |
| 4,203,476 | 5/1980 | Vitellaro | 174/47 X |
| 4,224,463 | 9/1980 | Koerber et al. | 174/47 |
| 4,224,965 | 9/1980 | Suchor | 174/47 X |
| 4,310,946 | 1/1982 | Baker et al. | 138/129 X |

Primary Examiner—Laramie E. Askin
Attorney, Agent, or Firm—Francis N. Carten

[57] ABSTRACT

An electrical current-carrying flexible hose wherein a strip is helically wound in tubular form with interlocking tongue and groove edge portions and insulated electrical conductor means are disposed within a hollow central section between the edge portions.

11 Claims, 5 Drawing Figures

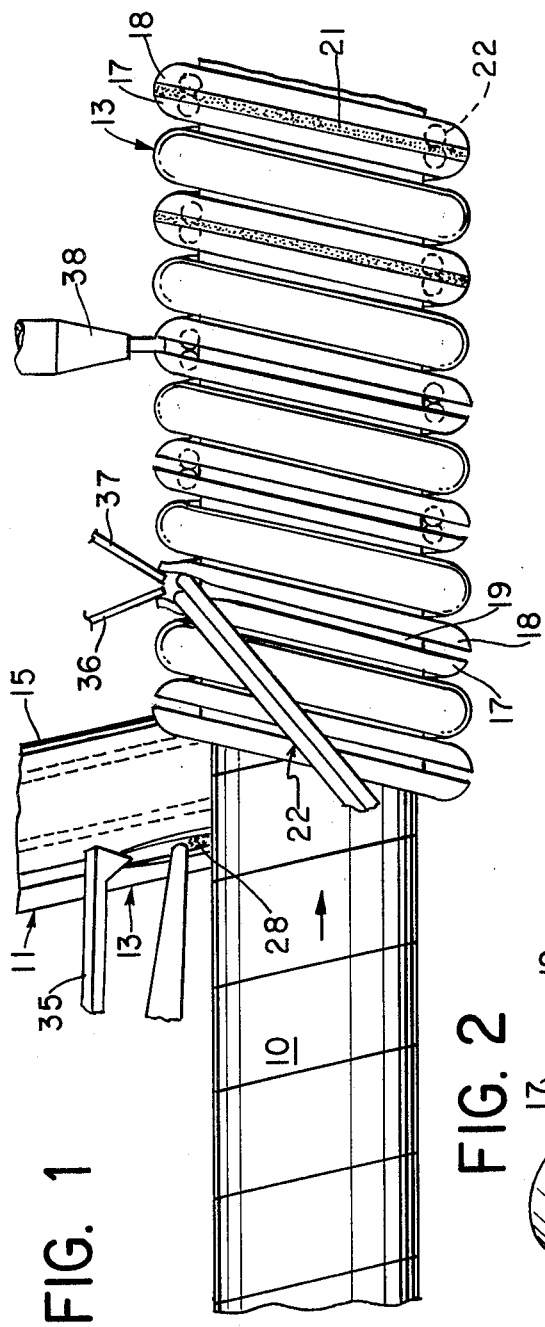
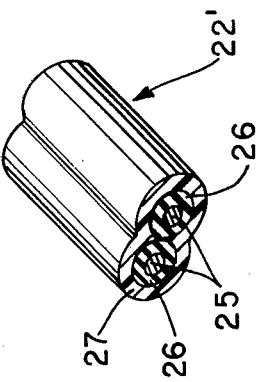
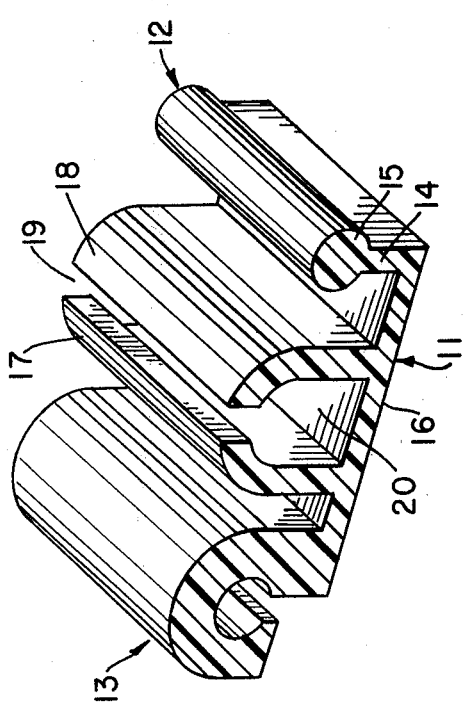

ELECTRICAL CURRENT-CARRYING FLEXIBLE HOSE AND METHOD OF MAKING SAME

BACKGROUND OF THE INVENTION

Electrical current-carrying flexible hose has heretofore been available wherein one or more electrical wires are embedded within an extruded section. A typical example is that shown in U.S. Pat. No. 4,167,645. The weight of such hose is considerable due to the solid extrusion around the conductors, and the extrusion process is quite slow. Flexibility is also limited due to the relatively thick walls. Other current-carrying flexible hose designs such as that described in U.S. Pat. No. 4,224,463 do not involve a solid extrusion with an embedded conductor but in those designs the insulated wires are exposed internally to the fluid being conveyed. In instances where the conveyed fluid is water, perhaps containing abrasive materials, the useful life of the conductors is limited because of the wear to which they are subjected.

One relevant form of interlocking strip flexible hose in the prior art is that described in U.S. Pat. No. 3,199,541 wherein interlocking tongue and groove connecting elements are formed in edge portions of the strip. Such designs do not include electrical conductors and consist only of the single convolute extrusion. One object of the present invention is to improve upon that concept of interlocking strip flexible hose such so that the hose includes electrical current-carrying means. In making such modifications the disadvantages of prior art electrical current-carrying flexible hose, in parrticular excess weight and poor flexibility, are avoided.

STATEMENT OF THE INVENTION

The invention provides an improvement in an electrical current-carrying flexible hose wherein a strip is helically wound in tubular form with interlocking tongue and groove edge portions connecting adjoining convolutions. The improvement comprises a helically central section on the strip between the tongue and groove edge portions. Electric conductor means are disposed within the hollow central section. A longitudinal opening is formed in the hollow central section through which the conductor means is inserted and sealing means are provided for closing the opening.

The invention also provides a method of making an electrical current-carrying flexible hose which includes an extended strip having matching tongue and groove edge portions alongside a hollow central section in which a longitudinal opening is formed. The method comprises advancing the strip toward an axially rotating and translating cylindrical mandrel surface. The strip is wound helically about the mandrel surface in tubular form with the tongue and groove edge portions interlocked to connect adjoining convolutions with the longitudinal opening of the hollow central section directed outwardly. At least one insulated electric conductor is continuously laid in the hollow central section through the longitudinal opening. The longitudinal opening is then closed with sealing means.

BRIEF DESCRIPTION OF THE DRAWINGS

FIG. 1 is a fragmentary elevation of a mandrel on which the flexible hose of the invention is being wound;

FIG. 2 is an enlarged fragmentary perspective view of the extruded strip used to form the hose of the invention;

FIG. 3 is an enlarged fragmentary perspective view of the insulated conductors used in the hose of the invention;

Figure 4:
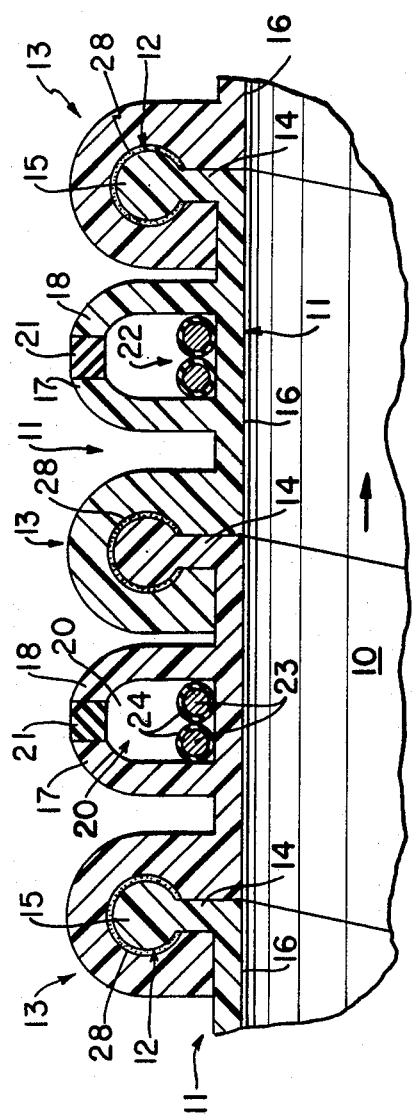
FIG. 4 is an enlarged fragmentary section of the strip and conductors of the invention applied to the mandrel surface and forming adjoining convolutions.

Each of FIGS. 1 and 4 shows a portion of a mandrel surface 10 which is cylindrical, cantilevered at one end, and which rotates about its axis and translates toward its outer end as shown by the arrows. Such a mandrel device is described in detail in U.S. Pat. No. 3,155,559 and it allows helically disposed elements to be applied in convolutions in a continuous fashion so that a composite hose emerges in continuous lengths from the end of the mandrel surface 10, from left to right as seen in FIGS. 1 and 4.

One such element is shown in detail in FIG. 2 as an extruded strip 11 of elastomeric material or, preferably, a plastic such as polyvinylchloride. In certain cases, polyethylene, polypropylene, ethyl vinyl acetate, nylon or other thermoplastic may be employed. The strip 11 includes a tongue portion 12 and a groove portion 13 disposed in opposite directions perpendicular to the general plane of the strip and on opposite longitudinal edge portions thereof. The tongue portion 12 includes a flange 14 with a bead 15 along the outer edge thereof and the bead is generally of circular cross section. The groove portion 13 is formed with a cross section conforming to the outer surface of the flange 14 and bead 15. The face 16 of the strip 11 opposite the tongue and groove portion is flat so that it defines a uniform cylindrical inside surface of the hose when the strip is helically arranged in tubular form.

Between the tongue and groove edge portions 12 and 13 of the strip 11 are integral opposed wall portions 17 and 18 which extend in the same direction as the tongue and groove edge portions. The wall portions 17 and 18 curve towards one another at their outer ends to form a longitudinal opening 19 which provides access to the hollow center 20 of the central section of the strip.

In accordance with the method described below a continuous elastomeric seal 21 is disposed in the opening 19 to close the opening, and the material of the seal may be the same as that of the strip itself. Before being closed, however, a dual wire insulated electrical conductor 22 is disposed within the hollow center 20 of the central section of the strip, again in a manner described below. The conductor consists of two metal wires 23 perhaps of copper clad steel, copper, aluminum or aluminum clad steel, either solid or stranded and twisted. Each such wire is surrounded by its own plastic electrical insulation 24. An alternate form of the dual wire electrical conductor is shown at 22' in FIG. 3 to consist of wires 25 surrounded by a respective first layer of insulation 26 and a secondary plastic insulation 27 surrounding both of the individually insulated wires to form a double layer of dielectric insulation.

A layer of adhesive 28 is disposed within the groove portion 13 and around the interlocking tongue portion 12 as shown in FIG. 4 in the assembled form of the hose section.

Figure 5:
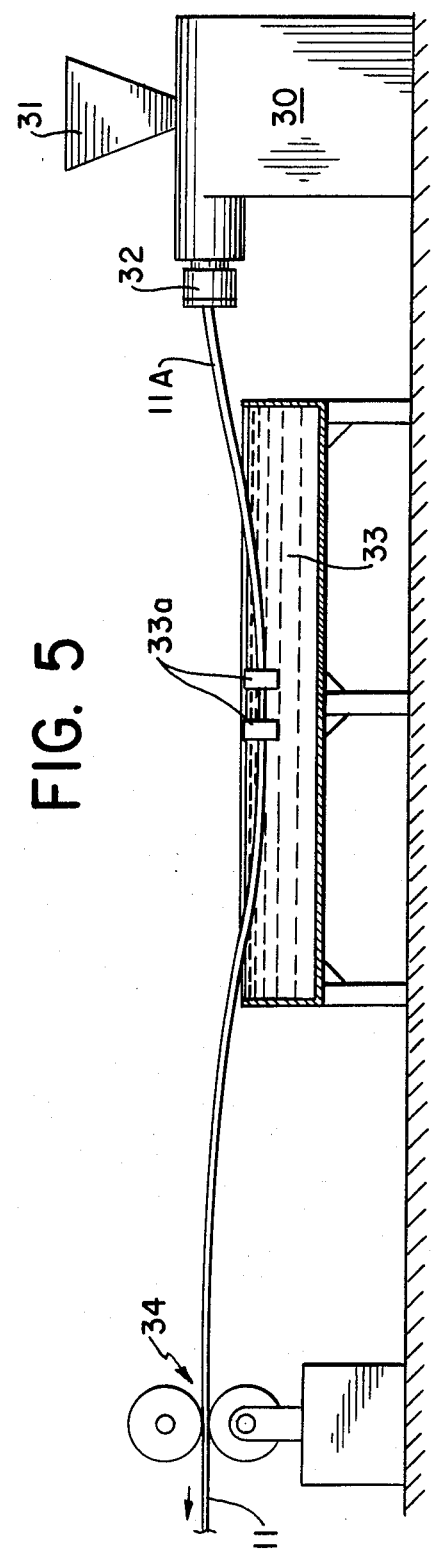
FIG. 5 is a schematic view illustrating the extrusion of the strip prior to winding on the mandrel.

Turning now to FIGS. 1 and 5 the method of making the hose of the invention is described in detail. A plastic extruder 30 with a hopper 31 is utilized to form the strip 11A in oversized configuration through a coin die 32. The oversize extrusion is then drawn down to the desired dimension by stretching the plastic through sizing fixtures 33a located in a water trough 33. The hot extrusion is cooled and solidified in the cold water within the trough after it passes through the sizing fixtures. A puller 34 at the opposite end of the water trough controls the drawing size by a controlled speed synchronized with the extrusion speed. After leaving the puller, the strip 11 proceeds toward a belt type mandrel of the form mentioned previously. As the strip advances axially toward the mandrel surface, a finger 35 widens the groove section 13 of the strip 11 and permits entry of a hot melt plastic adhesive which eventually provides the adhesive 28 bonding the tongue and groove portions together. The strip 11 is then wrapped helically about the mandrel 10 with its face 16 in contact with the mandrel. As each convolution is applied, the groove portion 13 is snapped over the tongue portion 12 of a prior convolution to form a tubular structure as shown in FIGS. 1 and 4. Two pry bars 36 and 37 widen the opening 19 between the wall portions 17 and 18 to allow the pair of insulated electrical conductors 22 to be laid continuously within the hollow center 20 formed by the wall portions 17 and 18. After the conductors are placed inside the convolute in this fashion, the plastic adhesive 21 is extruded into the opening from an extruder nozzle die 38 to lay the continuous bead or seal 21 in place.

The assembled hose proceeds continuously off the end of the mandrel 10 in indefinite lengths.

In accordance with the invention a very flexible light-weight hose is provided with insulated wires protected within the convoluted hollow tube. Since the dual wires are disposed relatively loosely within the hollow center of the strip, a certain amount of movement can take place between them and the strip and flexibility is thereby enhanced. Such a construction is particularly advantageous for vacuum cleaner wet fluid pick-up applications.

The scope of the invention is set forth in the following claims.

I claim:

1. In an electrical current-carrying flexible hose wherein a strip is helically wound in tubular form with interlocking tongue and groove edge portions connecting adjoining convolutions, the improvement comprising:
    (a) a hollow central selction on said strip between the tongue and groove edge portions,
    (b) electrical conductor means disposed within said hollow central section,
    (c) a longitudinal opening in said hollow central section through which said conductor means is inserted, and
    (d) sealing means closing said opening.

2. A flexible hose according to claim 1 wherein the strip is a unitary extruded strip of elastomeric material.

3. A flexible hose according to claim 1 wherein the tongue and groove edge portions project radially outwardly and inwardly respectively relative to the hose centerline.

4. A flexible hose according to claim 1 wherein the hollow central section is defined by opposed walls projecting radially outwardly relative to the hose centerline.

5. A flexible hose according to claim 1 wherein the sealing means closing the opening is a continuous elastomeric seal.

6. In an electrical current-carrying flexible hose wherein a unitary extruded elastomeric strip is helically wound in tubular form with interlocking tongue and groove edge portions projecting radially outwardly and inwardly respectively relative to the hose centerline, the improvement comprising:
    (a) a hollow central section on said strip between the tongue and groove edge portions defined by opposed walls projecting radially outwardly relative to the hose centerline,
    (b) a dual wire insulated electrical conductor disposed within said hollow central section between said walls,
    (c) a longitudinal opening in said hollow central section defined between said walls through which said conductor is inserted, and
    (d) a continuous elastomeric seal closing said opening.

7. A method of making an electrical current-carrying flexible hose which includes an extended strip having matching tongue and groove edge portions alongside a hollow central section in which a longitudinal opening is formed which comprises:
    (a) advancing said strip toward an axially rotating and translating cylindrical mandrel surface,
    (b) helically winding said strip about said mandrel surface in tubular form with the tongue and groove edge portions interlocked to connect adjoining convolutions with the longitudinal opening of the hollow central section directed outwardly,
    (c) continuously laying at least one insulated electrical conductor in said hollow central section through said longitudinal opening, and
    (d) closing said longitudinal opening with sealing means.

8. A method according to claim 7 wherein an adhesive is disposed in the groove edge portion prior to interlocking with the tongue edge portion.

9. A method according to claim 7 wherein the strip is first extruded continuously of elastomeric material in oversize configuration and is stretched and drawn down to intended configuration prior to setting.

10. A method according to claim 7 wherein the longitudinal opening is closed with a continuous bead of elastomeric material.

11. A method of making an electrical current-carrying flexible hose which includes an extended strip of elastomeric material having matching tongue and groove edge portions alongside a hollow central section defined by opposed walls in which a longitudinal opening is formed which comprises:
    (a) extruding the strip continuously in oversize configuration and stretching it down to intended configuration prior to setting,
    (b) disposing an adhesive in a continuous bead in the groove edge portion,
    (c) advancing said strip toward an axially rotating and translating cylindrical mandrel surface,
    (d) helically winding said strip about said mandrel surface in tubular form with the tongue and groove edge portions interlocked and adhered together to connect adjoining convolutions with the walls and longitudinal opening of the hollow central section directed outwardly,
    (e) spreading apart said walls to widen said opening,
    (f) continuously laying a pair of insulated electrical conductors in said hollow central section through said longitudinal opening,
    (g) closing said longitudinal opening with a continuous bead of elastomeric material, and
    (h) removing said hose from said mandrel surface.

* * * * *